(12) United States Patent
Rothe et al.

(10) Patent No.: US 6,536,831 B2
(45) Date of Patent: Mar. 25, 2003

(54) CONVERTIBLE VEHICLE

(75) Inventors: Karl Rothe, Rieste (DE); Klaus Russeke, Bissendorf (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 09/879,284

(22) Filed: Jun. 12, 2001

(65) Prior Publication Data

US 2002/0074822 A1 Jun. 20, 2002

(30) Foreign Application Priority Data

Jun. 15, 2000 (DE) .......................................... 100 29 472

(51) Int. Cl.⁷ ................................................. B60J 1/18
(52) U.S. Cl. .............................. 296/107.07; 296/146.14
(58) Field of Search .......................... 296/107.07, 146.14

(56) References Cited

U.S. PATENT DOCUMENTS

| 4,784,428 A | * 11/1988 | Moy et al. | ............. 296/107.07 |
| 5,456,516 A | * 10/1995 | Alexander et al. | ...... 296/146.14 |
| 2002/0024230 A1 | * 2/2002 | Pfertner et al. | ........ 296/107.07 |
| 2002/0030380 A1 | * 3/2002 | Rothe et al. | ............ 296/107.07 |

FOREIGN PATENT DOCUMENTS

| DE | 3808-909 C | * 4/1989 | ............. 296/146.14 |
| IT | 662106 B | * 4/1964 | ............. 296/107.07 |
| JP | 404011516 A | * 1/1992 | ............. 296/107.07 |

* cited by examiner

*Primary Examiner*—D. Glenn Dayoan
*Assistant Examiner*—Jason Morrow
(74) *Attorney, Agent, or Firm*—Jordan and Hamburg LLP

(57) ABSTRACT

A convertible vehicle with a folding top having a flexible roof skin and a folding top frame constructed in mirror image fashion to a longitudinal median plane of the vehicle. The folding top includes a frame part having a window frame for surrounding a rear window and including side legs and an upper transverse leg extending between the side legs. The folding top can be transferred into or out of a folding top compartment at a rear of the vehicle by shifting it about a main bearing. The frame part also includes a clamping collar having a basic strut situated below the rear window and side struts alongside the basic strut. The frame part can be swiveled by more than 90° during the movement of the folding top into an open position and is hinged by connecting parts directly at the folding top frame.

23 Claims, 5 Drawing Sheets

CONVERTIBLE VEHICLE

BACKGROUND OF THE INVENTION

Figure 1:
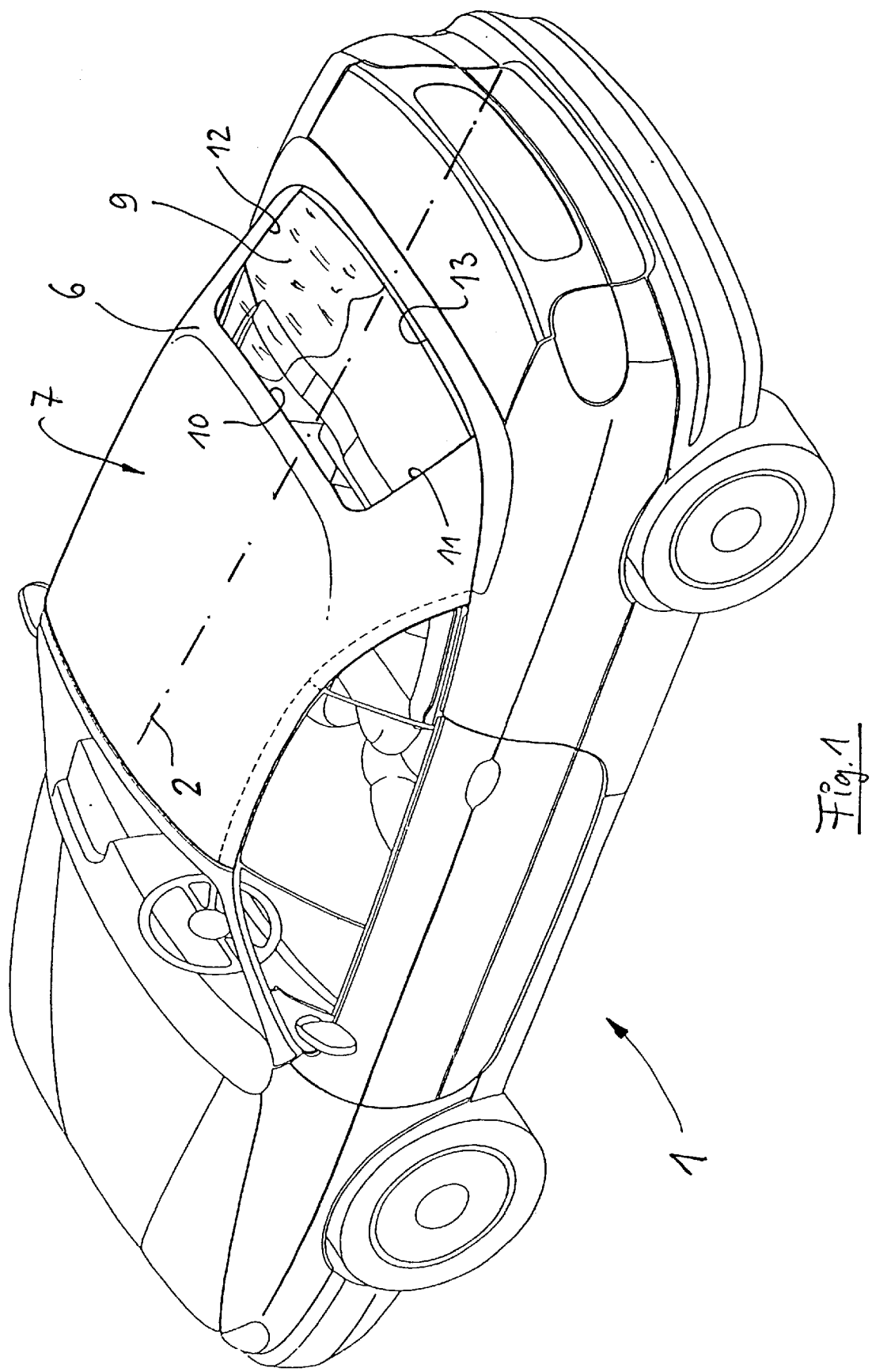

The invention relates to a vehicle with a folding top with a flexible roof skin with a dimensionally stable rear window.

In a known convertible vehicle including a folding top with a flexible roof skin (such as described in German Auslegeschrift No. 11 79 125), the folding top is constructed essentially in mirror image fashion to a longitudinal median plane of the vehicle and is pivotally supported in a main bearing. The folding top has a frame which embraces a rear window and can be fixed in a closed position by means of a connecting rod. The folding top frame is connected in scissor fashion and shifted with the connecting rod horizontally to the folding top frame and subsequently can be swiveled into a folding top compartment in the vehicle. At the same time, the material of the folding top is subjected to additional stresses by folding, the horizontal displacement requires an essentially vertically extending rear window and, during the closing process, the lower edge region of the rear window must be brought from the inside to the edge of the car body, so that an expensive control system is required in order to avoid leaks.

SUMMARY OF THE INVENTION

The present invention is concerned with the problem of providing a convertible vehicle of the type discussed above and having a rear window holding device which can be adapted to an aerodynamically flat folding top contour and can be swiveled without additional expense for a driving mechanism and for controls. Further, it is provided that the material of the folding top experiences only slight folding motions during the swiveling movement and a reliably tight closure at the car body side is achieved at little cost.

In the convertible vehicle in accordance with the invention, the rear window is held on three sides in a frame and is supported in the region of its lower transverse side edge directly on the clamping collar of the folding top. The clamping collar forms, together with the frame, a rack part which can be shifted as a one-part structural unit. Since the transverse side edge of the rear window extends down to the bow-shaped partial region of the structural unit, the total area of the rear window is enlarged advantageously in the downward direction and, as a result, the view through the rear region of the convertible vehicle is improved as a whole, even for vehicles with an aerodynamically flat folding top contour.

The rear window or the rear window together with the frame part is integrated as a structural unit in the folding top cloth or skin such that, when the folding top is moved into the open or closed position, effective folding top cloth stresses in the roof skin are distributed optimally by the dimensionally stable construction of the structural unit and overloading is prevented. With this configuration of the rear region of the folding top, different requirements for the design and the aerodynamic configuration of the contour of vehicles can be met with little effort even if the overall height of the vehicle is low.

The structural unit, formed in one piece from the frame and the clamping collar for the folding top, can be integrated with little technical effort into the kinematic concept of the folding top frame and, together with the roof skin of the folding top, can be deposited in a folding top compartment at the rear of the vehicle. A particularly stable and pivotable support of the frame unit is achieved because the upper part of the frame unit interacts with respective linkage parts of the folding top and the lower bow-shaped side struts of the structural unit are supported pivotably in the region of the main bearing arranged on the body of the vehicle by appropriate supporting connectors. In this region, a support with an adjustable height may also be provided.

The pivotable frame unit acts together with a rear folding top compartment lid which, in the closed position, can be placed from above onto the basic strut or the side legs of the frame such that, with little control effort, a reliably tight closure to the interior of the car body is attained.

With regard to further details and advantageous development of the invention, reference is made to the following description and the drawings, in which the convertible vehicle in accordance with the invention with a one-piece structural unit is described in greater detail by way of an example.

IN THE DRAWINGS

Figure 2:
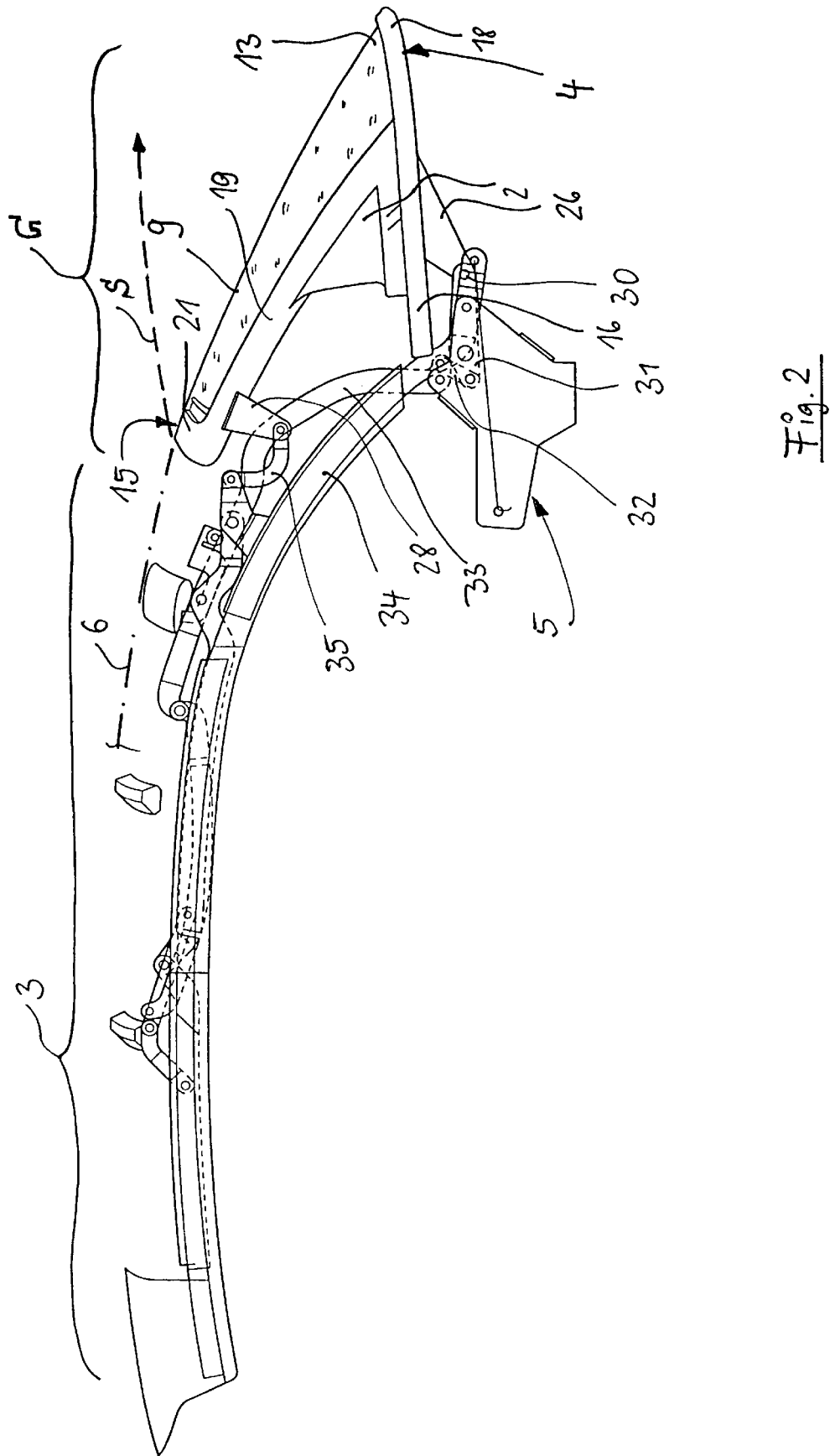
Figure 3:
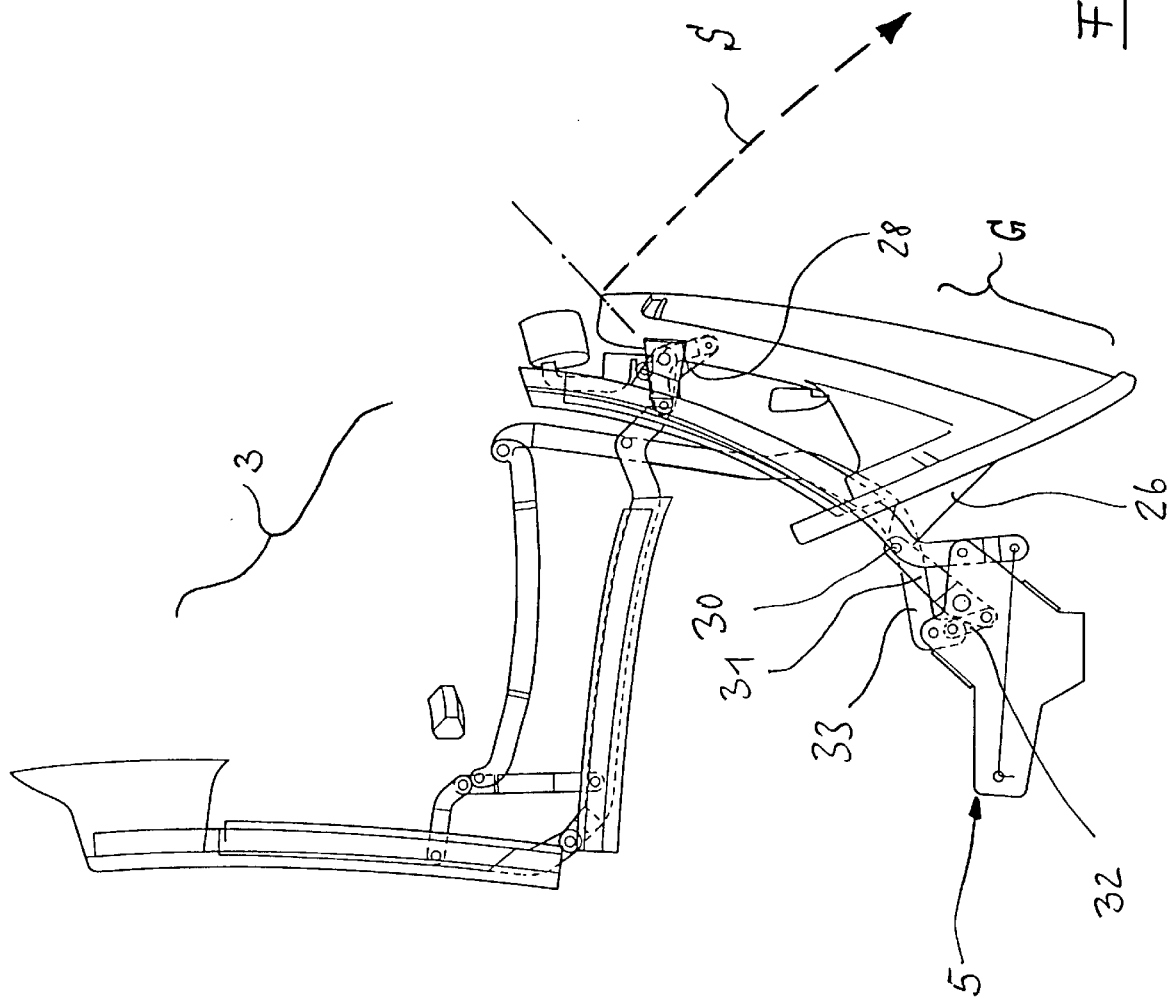
Figure 4:
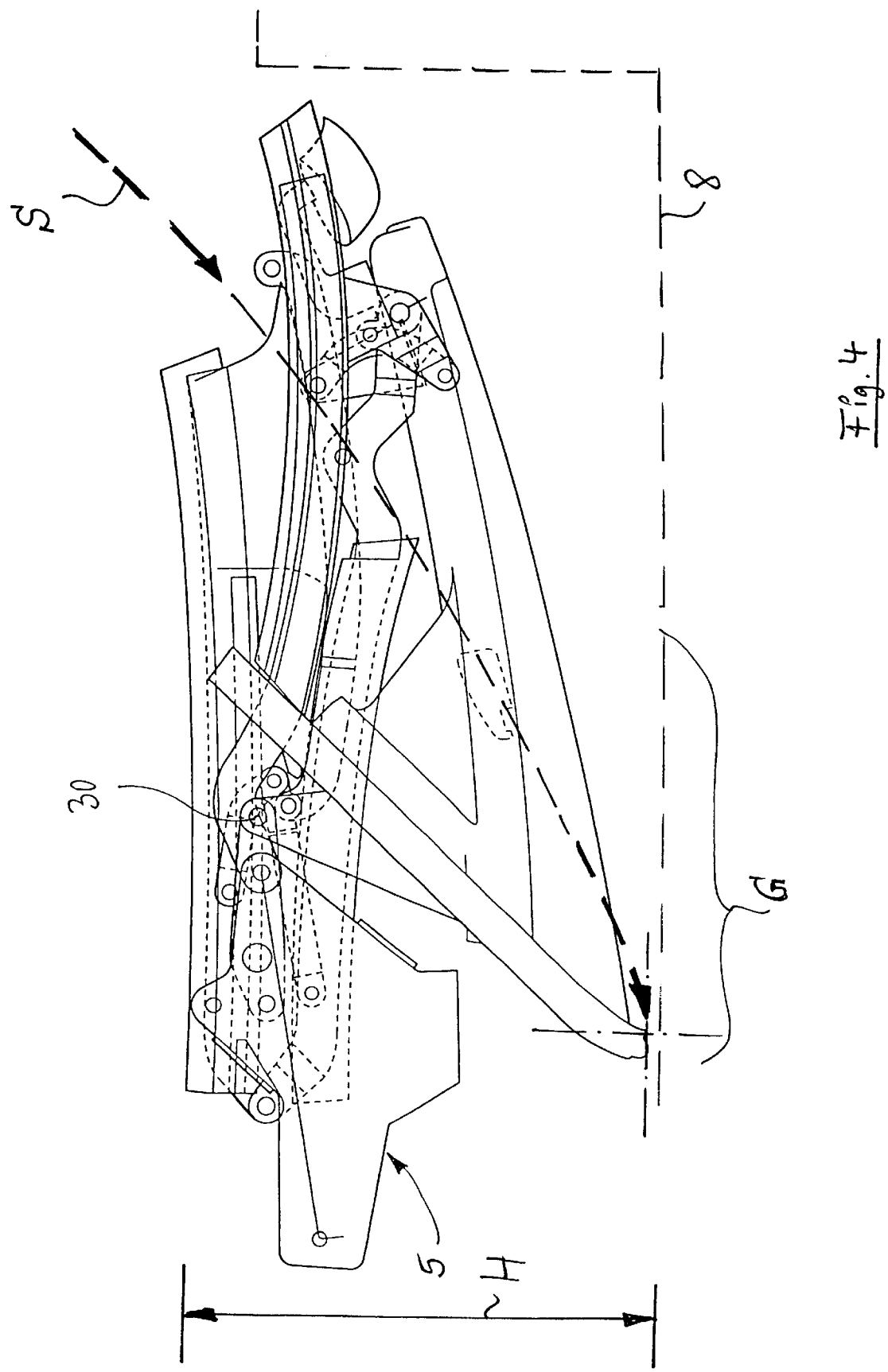
Figure 5:
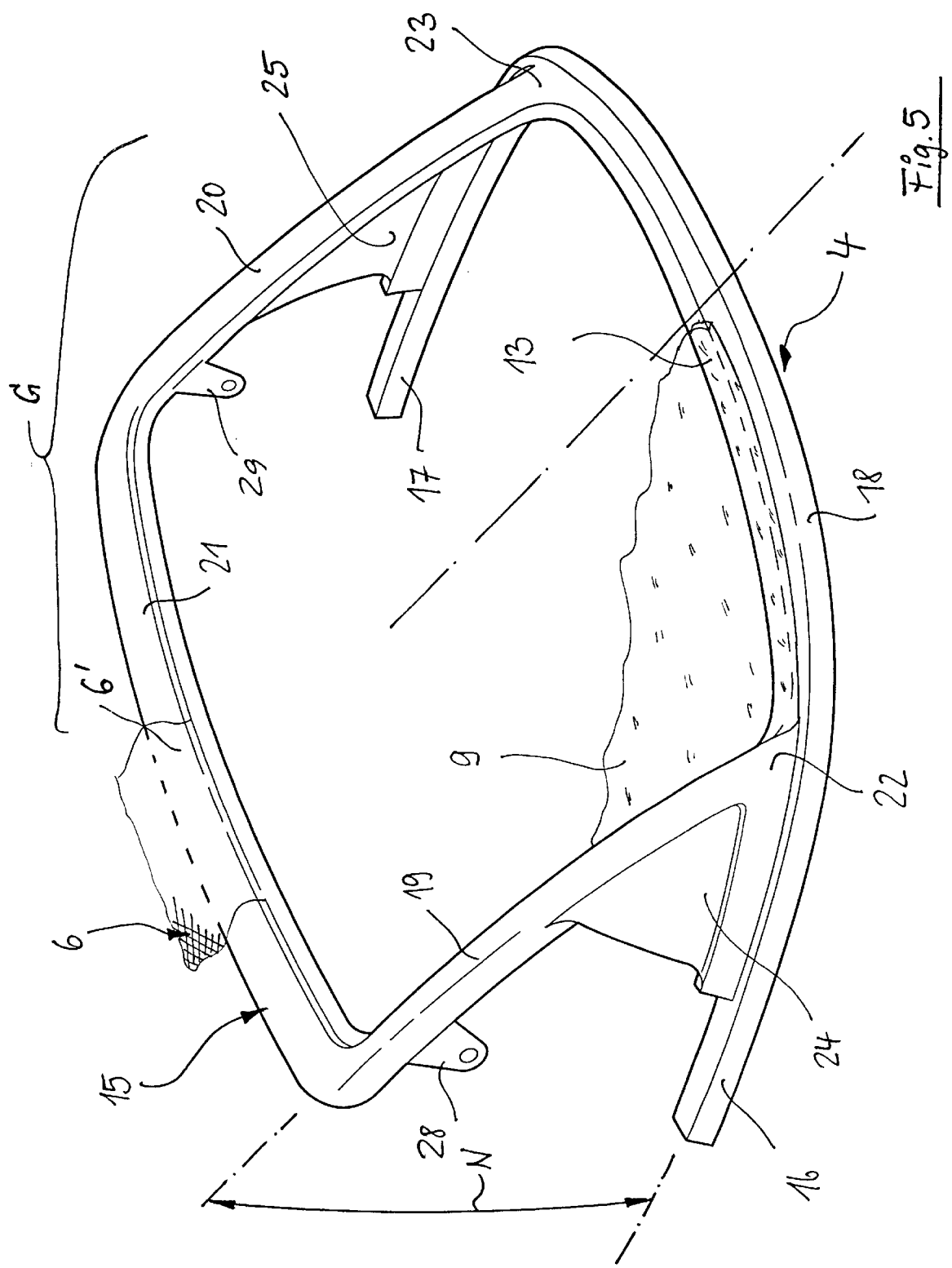

FIG. 1 shows a perspective rear view of a convertible vehicle in accordance with the invention with the folding top in the closed position, FIG. 2 shows a diagrammatic representation in side view of a folding top frame of FIG. 1, having a rear frame part, FIG. 3 shows the folding top frame of FIG. 2 in an opening phase, FIG. 4 shows the folding top frame of FIGS. 2 and 3 in a rear open position, and FIG. 5 shows a detailed representation of the frame part, which is provided as a structural unit in the region of the rear window.

DESCRIPTION OF THE PREFERRED EMBODIMENTS

In FIG. 1, a convertible vehicle 1 is shown and includes a folding top frame 3 (shown in FIG. 2) which is constructed in mirror image fashion to the longitudinal median plane 2 of the vehicle 1 and has a folding top clamping collar 4 at the rear. When shifted about a main bearing 5 attached to the car body, the folding top 7, which has a flexible roof skin 6, can be placed together with the folding top frame 3 in a folding top compartment 8 (FIG. 4) or returned from the folding top compartment 8 into the closed position. In the rear region of its flexible roof skin 6, the folding top 7 is provided with a rear window 9 having an essentially rectangular circumferential contour. The rear window extends above the folding top clamping collar 4 and is constructed, for example, as a solid glass pane.

The convertible vehicle 1 constructed in accordance with the invention is provided with the rear window 9 attached to the flexible roof skin 6 only in the region of the upper transverse side edge 10, as well as in a region of its two longitudinal side edges 11 and 12 which are parallel to the longitudinal median plane 2 of the vehicle. With its lower transverse side edge 13, the rear window 9 is supported directly on the folding top clamping collar 4 (FIG. 5). The folding top clamping collar 4, together with a U-shaped frame 15 which supports the rear window 9 and is connected with the roof skin 6, form a dimensionally stable structural unit G.

The detailed representation of FIG. 2 illustrates the structural units of the folding top frame 3 arranged in the rear region with the structural unit G which forms a frame part as a whole. The frame part G and the front parts of the folding top frame 3 can be moved by a driving device, the details of which are not shown, and the entire folding top frame 3, together with the frame part G, can be shifted jointly into the open position shown in FIG. 4.

In the embodiment shown, the rear window 9 is integrated in the frame 15 over appropriate glued, screwed and/or clamped connections, the details of which are not shown. It is also conceivable that the rear window 9 is held detachably at least regionally in the frame part G or in the frame 15 (not shown).

The detailed representation of FIG. 5 illustrates that the frame part G is provided with side struts 16, 17 forming the contour shape of the folding top clamping collar 4, and a basic strut 18 which extends between the side struts 16,17. The two parallel side legs 19 and 20 of the frame 15, closed off by an upper transverse leg 21, are supported in the transition region between the two side struts 16 and 17 and the basic strut 18. In an appropriate embodiment, the U-shaped frame 15 can be welded in the region of its parallel side legs 19 and 20 in each case terminally (at the terminal or lower end of the side legs 19,20) in the connecting regions 22 and 23 with the basic strut 18 of the folding top clamping collar 4. All of these strut parts can be produced as extruded aluminum profiles, compressed profile parts, rolled profiles, etc., and connected by welding.

In an appropriate embodiment, the frame part G is constructed as a one piece structural unit, especially as an aluminum die casting.

In the region connecting the side legs 19, 20 of the frame 15 to the basic strut 18, the frame part G is provided in each case with an angle bracket 24, 25 which reinforces the frame part G as a whole, so that a fixed angle which defines the installed inclination (angle N) of the frame 15 in the total concept of the vehicle, is formed between these two functional supports of the structural unit and the angle brackets 24, 25. With the angle brackets 24 and 25, the frame part G is stiffened as a whole and, in the closed position of the folding top 7, the roof skin 6 is grasped from below so as to give it shape and to tighten it.

In the installed position of the frame part G, the U-shaped frame 15 is overlapped by the roof skin 6 of the folding top 7 in the region of the upper transverse leg 21 and the two side legs 19 and 20 (FIG. 5, sectional representation of the roof skin 6 with the connecting edge 6'). The roof skin 6 may be connected to the frame by sewing, screwing, gluing or clamping. In the region of the side struts 16 and 17 also, the roof skin is fixed over piping, the details of which are not shown.

The side views of FIGS. 2–4 illustrate that the one-piece frame part G is connected to the main bearing 5 by means of a connecting shoulder 26 on one side of the frame part G (as well as by another connecting shoulder on the other side of the frame part G but which is not shown). Specifically, as shown, the side strut 16, protruding from the basic strut 18, is connected to the main bearing 5 by means of the connecting shoulder 26, while in a similar manner, the side strut 17, protruding from the basic strut 18 is connected to the main bearing 5 by means of the connecting shoulder on the other side of the frame part G (which connecting shoulder is not shown). The U-shaped frame 15 is hinged over two connecting flanges 28 and 29 to the folding top frame 3 in the region of the side legs 19.

The movement phases of this construction of FIGS. 3 and 4 illustrate that the frame part G, starting out from the closed position of FIG. 2, is swiveled about the main bearing 5 by more than 90° (swiveling path S). In order to achieve an installation position of the frame part G and the swiveled parts of the folding top frame 3 which is as flat as possible, (height H, FIG. 4), provisions are made so that the fulcrum 30 of the connecting shoulder 26 is shifted during the swiveling movement so that the depth of immersion of the components as a whole into the car body is slight.

In the region of the main bearing 5, the fulcrum 30 is shifted by a lever 31 arranged at the main bearing 5 and connected by a connecting rod 32 with a guiding strut 33 arranged at the folding top frame 3. The front connecting flange 28 or 29 is connected directly with the roof frame parts of the folding top 3 or hinged to the main column 34 of the folding top by an oscillating lever 35.

If the dimensions of the vehicle are appropriate, the folding top construction with the frame part G described above can be lowered completely into the folding compartment 8 and closed off by an appropriate cover, such as a folding top compartment lid (not shown). It is also conceivable that the folding top 7, similar in construction to that shown in FIG. 4, is placed in the folding top compartment 8 and the upper region of the components is covered by a canvas, the details of which are not shown.

In the closed position of the frame part G (FIG. 2), the frame part G is swiveled up from the open position shown in FIG. 4 and the folding top compartment lid, the details of which are not shown, lies on the region of the folding top clamping collar 4 or the basic strut 18 and the side leg 16, 17 in such a manner that a reliably tight closure is achieved with little control effort.

What is claimed is:

1. A convertible vehicle, comprising
   a folding top including a folding top frame, a rear window, a frame part and a flexible roof skin,
   said frame part including a window frame framing said rear window and a clamping collar,
   said clamping collar having a basic strut arranged below said rear window and side struts arranged on each side of said basic strut,
   said window frame having opposed side legs and an upper transverse leg extending between said side legs, said side legs being connected to said clamping collar, said window frame further comprising angle brackets each arranged in an area in which a respective one of said side legs of said window frame is connected to said clamping collar, said angle brackets being arranged to reinforce said frame part in a direction of said side struts,
   said folding top further comprising connecting parts for hingedly connecting said frame part to said folding top frame.

2. The convertible vehicle of claim 1, wherein said window frame and said clamping collar are formed as a one-piece structural unit.

3. The convertible vehicle of claim 1 or 2, wherein a part of said rear window is connected to said frame part.

4. The convertible vehicle of claim 1 or 2, wherein a lower end of each of said side legs of said window frame is welded to said clamping collar.

5. The convertible vehicle of claim 1, wherein said angle brackets define an inclination angle of said window frame.

6. The convertible vehicle of claim 1 or 2, wherein window frame is overlapped by said roof skin of said folding top in a region of said upper transverse leg and said side legs.

7. The convertible vehicle of claim 1 or 2, further comprising a main bearing for pivotally supporting said folding top, said folding top being shiftable about said main bearing between an open position and a closed position, said frame part being supported in a region of said main bearing by said side struts and said side legs of said window frame being hinged by said connecting parts to said folding top frame.

8. The convertible vehicle of claim 1, wherein said folding top frame is constructed in mirror image fashion to a longitudinal median plane of the vehicle.

9. The convertible vehicle of claim 1, further comprising a folding top storage compartment for storing said folding top, said folding top including said window frame being movable between an open, compacted position in which said folding top is stored in said folding top storage compartment and a closed, stretched position.

10. The convertible vehicle of claim 9, further comprising a main bearing for pivotally supporting said folding top, said folding top being shiftable about said main bearing between the open position and the closed position.

11. The convertible vehicle of claim 10, wherein said frame part is swivelable about said main bearing by more than 90° during the movement of said folding top into the open position.

12. The convertible vehicle of claim 1, wherein said window frame is U-shaped and surrounds said rear window on three sides.

13. The convertible vehicle of claim 1, wherein a lower end of each of said side legs of said window frame is fixedly connected to said basic strut of said clamping collar.

14. The convertible vehicle of claim 1, wherein said rear window has a rectangular circumferential contour.

15. The convertible vehicle of claim 1, wherein said rear window is attached to said roof skin only in a region of an upper transverse edge and side edges.

16. The convertible vehicle of claim 1, wherein said rear window is supported directly on said clamping collar.

17. The convertible vehicle of claim 1, wherein said connecting parts comprise a connecting shoulder arranged on each of said side struts of said clamping collar.

18. The convertible vehicle of claim 17, further comprising a main bearing for pivotally supporting said folding top, said connecting parts further comprising a lever attached to a fulcrum of said connecting shoulder, said lever being rotatably mounted to said main bearing whereby said fulcrum of said connecting shoulder is shifted by rotation of said lever about said main bearing.

19. The convertible vehicle of claim 18, wherein said folding top frame includes a guiding strut, said connecting parts further comprising a connecting rod connecting said lever to said guiding strut.

20. The convertible vehicle of claim 1, wherein said connecting parts include a front connecting flange arranged on each of said side legs of said window frame.

21. The convertible vehicle of claim 20, wherein said folding top further includes a main column, further comprising an oscillating lever for connecting said front connecting flanges to said main column.

22. The convertible vehicle of claim 1, wherein each of said side legs of said window frame is connected to said clamping collar at a transition region between said basic strut and a respective one of said side struts.

23. The convertible vehicle of claim 1, wherein said angle brackets extend alongside at least a portion of said side struts.

* * * * *